June 12, 1923.
J. C. MIRE
ARMORED TIRE
Filed May 8, 1922
1,458,191
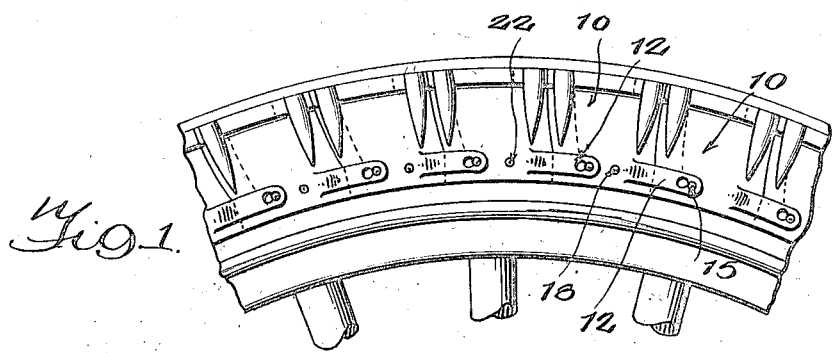
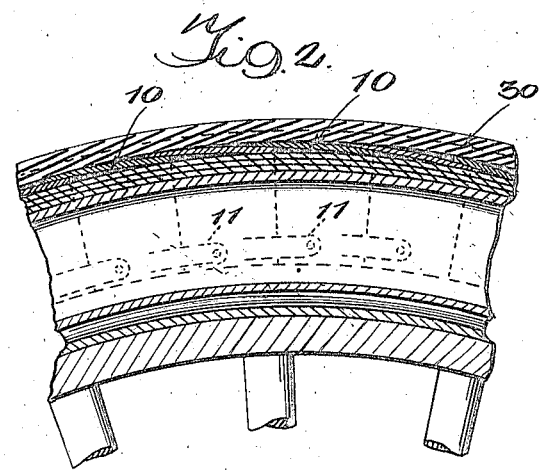
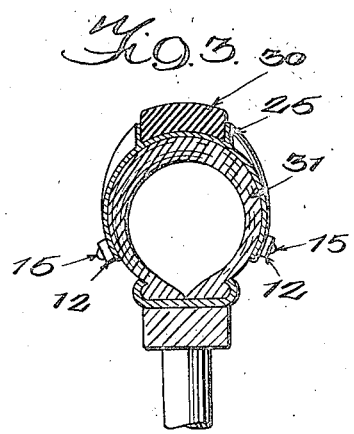
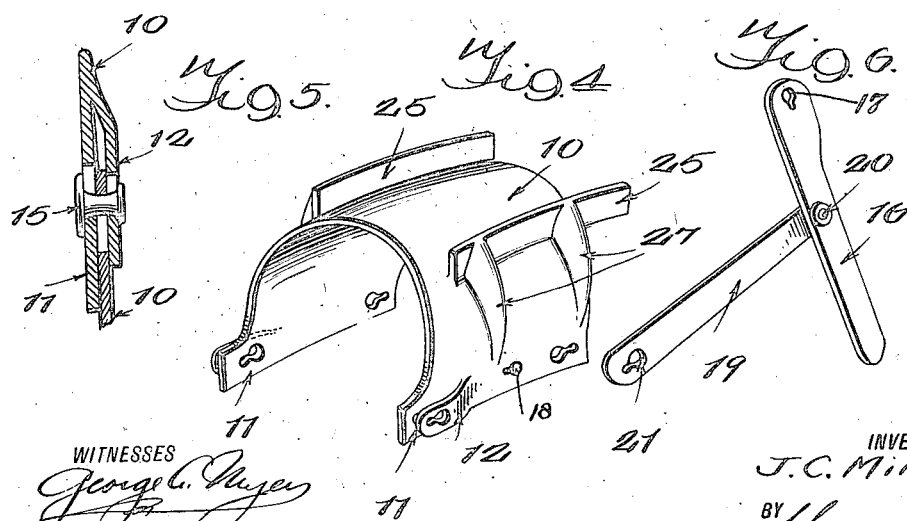
WITNESSES
INVENTOR
J.C. MIRE,
BY
ATTORNEYS Patented June 12, 1923.

1,458,191

UNITED STATES PATENT OFFICE.

JOSEPH CLEMENT MIRE, OF FEITEL, LOUISIANA.

ARMORED TIRE.

Application filed May 8, 1922. Serial No. 559,341.

*To all whom it may concern:*

Be it known that I, JOSEPH CLEMENT MIRE, a citizen of the United States, and a resident of Feitel post office, in the parish of St. James and State of Louisiana, have invented certain new and useful Improvements in Armored Tires, of which the following is a specification.

This invention relates to an improvement in armored tires for use on automobiles or other motor vehicles.

The object of the invention is to provide an improved tire of this character which possesses relatively high cushioning properties while presenting a substantially puncture-proof construction and which is of simple and durable construction, reliable in use and easy and comparatively inexpensive to manufacture Another object is to provide a tire of this character which may be readily placed on or taken from the various types of rims.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a fragmentary view in side elevation, illustrating the preferred embodiment of the invention;

Figure 2 is a view in section, taken approximately in the plane of the wheel;

Figure 3 is a view in section, taken at right-angles to Figure 2;

Figure 4 is a detail perspective view of one of the curved plates or sections making up the tire armor;

Figure 5 is a detail view in section, illustrating the interlocking means for the sections or curved plates; and Figure 6 is a detail perspective view of the operator of the interlocking sections.

Referring to the drawings wherein for the sake of illustration is shown the preferred embodiment of the invention it will be seen that the tire which constitutes the present invention preferably comprises a plurality of segmental sections, each consisting of a curved metallic plate conforming in general to the contour of a tire and designated at 10. When assembled, the sections or curved plates 10 overlap, as shown in Figure 2 and are relatively movable with respect to each other since the sections may, within limits, be moved so as to overlap each other more or less. Each section 10 includes at one end circumferentially extending lugs 11 and attaching plates 12 arranged in laterally spaced relation with respect to the lugs 11. The lugs 11 and the attaching plates 12 of one section are adapted to embrace the end of the adjacent section, as shown in Figure 5. Openings having the form of key hole slots are provided in the lugs 11, attaching plates 12 and in the portions of the adjacent sections comprehended between these parts in the assembly and a button or locking stud, designated at 15, is carried by each lug 11 and coacts with these key hole slots or openings for releasably locking the sections 10 to each other.

An operating device is provided for this locking arrangement and preferably includes a lever 16 having a key hole slot 17 cooperable with a stud or projection 18 carried by one of the sections 10, and a link 19 pivotally connected as at 20 to the lever 16 and having a key hole slot 21 therein cooperable with the stud 22 provided on the section 10 which is adjacent to the section carrying the stud 18. It is obvious that when the key hole slots 17 and 21 of the lever 16 and link 19, respectively, are engaged with the studs 18 and 22, respectively, and the lever is manipulated that the sections will be drawn toward each other so as to dispose the locking buttons 15 into the enlarged portions of the key hole slots, permitting the sections to be taken apart or disassembled.

The curved plates which make up the sections 10 have integrally formed therewith a pair of circumferentially extending flanges 25 which are arranged parallel and in spaced relation to define a channel between them. These plates project at one end beyond the curved plate and terminate at their other end at a point slightly spaced from the edge of the plate so that in assembly the flanges or one section overlie the other section and have sliding interlocking engagement. These flanges 25 are reinforced with ribs 27 integral with the curved plate and with the flanges. An endless band 30 of rubber and other cushioning material is received in the channel defined by the flanges 25 and in the assembly snugly engages these flanges and the portions of the curved plate 10 comprehended between these flanges.

Within the enclosed space defined by the sections 10 a light weight shoe or casing 31 is arranged and may be of comparatively simple and inexpensive construction since it is protected by the sections 10 and associated parts. It is to be noted that the sections 10 are spaced from the rim so that the pneumatic properties of the tire are brought into play. Of course it is to be understood that an inner tube is arranged within the casing 31 and contains air under pressure as usual.

In use the tire operates to cushion the vehicle and to endow it with easy riding properties, thereby relieving the wear on the running gear and other parts of the machine. Moreover the tire being armored, it is puncture-proof and is comparatively inexpensive, since the elaborately constructed casing or shoe now employed may be dispensed with and the simple and yet durably constructed casing 31 which need not constitute more than a lining for the section 10 substituted therefor. The sections 10 may be readily and easily assembled or disassembled but when assembled and when the tire is pumped up these sections are not only held together by the interlocking action of the studs 15 and associated structure but also by the action of the endless band 30. The lever 16 and link 19 are readily operable to disengage the sections from each other when it is desired to take them from the wheel.

I claim:

1. In an armored tire, a casing, a plurality of sections encasing the casing, each comprising a transversely curved metallic plate, said metallic plates overlapping each other, interlocking means for releasably securing said sections to each other in assembly, circumferentially extending flanges carried by said curved metallic plates and defining a circumferentially extending channel, the flanges of each section slidably overlapping the adjacent section and an endless band of cushioning material received in said channel.

2. In an armored tire, a casing and an armor comprising a plurality of sections encasing the casing and each consisting of a transversely curved metallic plate, circumferentially extending flanges rigidly secured to said plates around the tread of the tire, webs rigidly secured to the flanges and to the plates for reinforcing the flanges, said webs also serving as traction elements, and an endless band of cushioning material arranged in between the flanges.

JOSEPH CLEMENT MIRE.